United States Patent [19]

Mendiratta et al.

[11] Patent Number: 4,668,768
[45] Date of Patent: May 26, 1987

[54] ANTI-SOLVENT PRECIPITATION PROCESS FOR ISOLATING POLYMERS FROM SOLUTION

[75] Inventors: Ashok K. Mendiratta, Schenectady; Wayne F. Morgan, Mechanicville, both of N.Y.

[73] Assignee: General Electric Company, Schenectady, N.Y.

[21] Appl. No.: 801,277

[22] Filed: Nov. 25, 1985

[51] Int. Cl.$^4$ .............................. C08J 3/12; C08J 3/14
[52] U.S. Cl. .................................... 528/493; 528/495; 528/498; 528/499; 528/502; 523/313
[58] Field of Search ............... 528/493, 495, 498, 499, 528/502; 210/729; 523/313

[56] References Cited

U.S. PATENT DOCUMENTS

| 2,989,503 | 6/1961 | Jibben et al. | 528/499 |
|---|---|---|---|
| 3,267,074 | 8/1966 | Wood | 528/499 |
| 3,505,273 | 4/1970 | Cleveland et al. | 528/499 |
| 3,590,026 | 6/1971 | Carlson et al. | 528/499 |
| 3,954,713 | 5/1976 | Schnöring et al. | 528/499 |
| 4,182,850 | 1/1980 | Marshall et al. | 528/480 |
| 4,205,162 | 5/1980 | Herscovici | 528/499 |
| 4,246,398 | 1/1981 | Sugio et al. | 528/499 X |
| 4,330,672 | 5/1982 | Hannon et al. | 528/499 X |
| 4,408,040 | 10/1983 | Flock et al. | 528/500 |
| 4,423,207 | 12/1983 | Flock et al. | 528/499 |
| 4,452,976 | 6/1984 | Kohyama et al. | 528/491 |
| 4,546,172 | 10/1985 | Kohyama et al. | 528/491 |

Primary Examiner—Joseph L. Schofer
Assistant Examiner—F. M. Teskin
Attorney, Agent, or Firm—Francis T. Coppa; James C. Davis, Jr.; James Magee, Jr.

[57] ABSTRACT

A method for isolating polymer resins from organic solvents is provided wherein the organic solvent is vaporized in a separation medium comprised of water and an organic anti-solvent for said polymer without significant vaporization of the organic anti-solvent. The polymer precipitates as a powder without high-speed, high-shear agitation and without the formation of a sticky globular mass.

10 Claims, No Drawings

ANTI-SOLVENT PRECIPITATION PROCESS FOR ISOLATING POLYMERS FROM SOLUTION

BACKGROUND OF THE INVENTION

This invention relates to a method for recovering polymers from solution. More particularly, it relates to a method for isolating polymer resin from organic solvents by precipitating the polymer within an aqueous-/organic anti-solvent medium.

There are several methods which have been suggested for separating polymers resins from organic solvents, such as those described in U.S. Pat. Nos. 3,590,026; 4,452,976; 3,505,273; 3,954,713; 4,408,040; 4,423,207; 4,205,162 and 2,989,503. In these processes the polymer is isolated by evaporating the organic solvents and precipitating the polymer within an aqueous medium. When utilizing aqueous media to isolate polymer resin, the polymer often forms a large sticky mass prior to precipitation. When formed, there must be sufficient agitation during the process to break up this sticky mass into a particulate product, as noted in U.S. Pat. No. 3,505,273. Breaking up this sticky mass requires a high level of shearing agitation, which is difficult to obtain in large scale operations.

Methods have been disclosed which avoid the formation of this large sticky mass when isolating polymers within aqueous media. These processes often depend on unique process equipment. The processes described in U.S. Pat. Nos. 4,408,040 and 4,423,207 utilize a spray nozzle designed to atomize the polymer solution within an aqueous medium. In the process described in U.S. Pat. No. 4,452,976, a wet pulverizer is used to break up large particles which form within the aqueous medium. Wood discloses the use of a "shearing device" in U.S. Pat. No. 3,267,074 to provide high levels of shearing agitation which prevent the formation of the sticky mass.

Herscovici, U.S. Pat. No. 4,205,162, utilizes a large quantity of water and adds the polymer solution at a slow rate, i.e., dropwise. Although non-shearing agitation is used, quantities of water in the range of 1000 to 2500 parts water per part polymer are used. Handling such large quantities of water on a large scale is difficult and expensive.

Modified aqueous media have been utilized in the prior art to prevent the formation of a sticky mass. Jibben, U.S. Pat. No. 2,989,503, discloses the addition of dimethylbenzene, a non-solvent for polycarbonate, to aid in the production of powdered and granular polycarbonate within aqueous media. The process of Jibben requires a significant expenditure of energy since this non-solvent must be evaporated. In addition, large quantities of a non-solvent are typically utilized. The weight ratio of non-solvent to polymer is greater than 10:1 in the examples provided and the preferred ratio is in the range of 10:1 to 20:1. In U.S. Pat. No. 3,590,026, Carlson et al. disclose the addition of a dispersant to the aqueous medium to prevent agglomeration of the polymers into a sticky mass. Such dispersants include surfactants, for example, potassium and sodium lignin sulfonates, zinc oxide, and water soluble saponified polymers of acrylic acid esters.

Isolation of polymers within organic anti-solvents for the polymer have been disclosed by Wood, U.S. Pat. No. 3,267,074 and Marshall et al., U.S. Pat. No. 4,182,850. However, large quantities of organic anti-solvent are required in such processes, i.e., at least 18 parts by weight anti-solvent per part polymer.

The use of specialized process equipment, high shear agitation, large quantities of anti-solvent and/or water, and large expenditures of energy is avoided in the process of this invention by utilizing both water and an organic anti-solvent, in combination, as the separation medium.

SUMMARY OF THE INVENTION

A process for isolating polymer resins from organic solvents is provided which comprises mixing an organic solvent containing up to 50% by weight polymer within a separation medium comprised of water and an organic anti-solvent for said polymer. The organic solvent is vaporized during mixing without significant vaporization of the anti-solvent and a powdery polymer precipitate is recovered from the mixture formed. The weight ratio of organic anti-solvent to polymer falls within the range of about 10:1 to 1:1. The organic anti-solvent is miscible in the organic solvent and preferably immiscible in water.

A primary object of the present invention is to provide a method by which polymer resins are isolated from organic solvents without utilizing special equipment or high speed, high shear agitation.

Another object of the present invention is to provide a method for precipitating polymers from solution which does not require large quantities of organic anti-solvent and/or water.

Further objects will be obvious from the detailed description herein.

DETAILED DESCRIPTION OF THE INVENTION

An important feature of this invention is the use of both water and an organic anti-solvent, in combination, as the isolation medium for the polymer. The presence of a small amount of organic anti-solvent for the polymer within an aqueous medium will eliminate the formation of the large sticky mass of polymer during evaporation of the solvent. The polymer will instead precipitate within the water/organic anti-solvent medium before forming a sticky glob. The term "organic anti-solvent" for a polymer refers to those solvents which, when added in a sufficient quantity, cause a polymer to precipitate from a solution without removal or reduction of the solvent medium. This is to be distinguished from non-solvents, which do not effect the solubility of a polymer within a solution when introduced in any quantity. The polymer is insoluble in both non-solvents and anti-solvents, but to precipitate a polymer by addition of a non-solvent, the solvent for the polymer must be removed.

The organic anti-solvent utilized must have a higher vaporization temperature than the organic solvent or solvents which contain the polymer. This permits vaporization of the organic solvent without significant vaporization of the organic anti-solvent. The term "significant vaporization" as used herein refers to vaporization of more than 50% of the total anti-solvent. Preferably, the organic anti-solvent has a boiling point significantly above the vaporization temperature of the organic solvents which contain the polymer and vaporization of the anti-solvent is maintained below 10% of the total anti-solvent, most preferably below 1%. Where the difference in boiling points is not significant, a loss in efficiency of the process may result due to vaporization of large quantities of organic anti-solvent, i.e., from 25 to 50% of the total anti-solvent.

The organic anti-solvent must also be miscible with the organic solvent or solvents which contain the polymer. In addition, where both the water and organic solvent are present, a major portion of the anti-solvent must be present in the organic solvent phase, with only a minor portion of the anti-solvent present in the aqueous phase. Preferably, the anti-solvent is immiscible in water. This preferential solubility within the organic solvent phase is necessary for the rapid isolation and precipitation of the polymer without the formation of a sticky glob. The preferred amount of organic anti-solvent utilized in this process provides a weight ratio of organic anti-solvent to polymer in the range of about 10:1 to 1:1. The lower ratios which fall outside this range are not effective in preventing the formation of sticky globs. The higher ratios which fall outside this range do provide the desired isolation of polymer resins from solution; however, the use of such large quantities of organic anti-solvent does not provide any significant benefit.

The particular anti-solvent utilized depends on the polymer to be precipitated. For polycarbonate, suitable anti-solvents may include ketones, such as methylisobutyl ketone, methylethyl ketone and acetone plus others, such as n-heptane, hexane, cyclohexane, methylcyclohexane, isoheptanes, ethylacetate, trichloroethylene, nitromethane, acetonitrile, diethylene carbonate and the like. For polyphenylene ethers, suitable anti-solvents include alkanols such as pentanol, hexanol, heptanol and the like. The suitability of these organic anti-solvents also depends on the organic solvent which must be vaporized and its vaporization temperature, as discussed with greater particularity above. Where methylene chloride is to be vaporized, methylethyl ketone, heptane, hexane, n-pentanol, n-hexanol and methylisobutyl ketone are suitable anti-solvents for polycarbonate.

An added benefit of the present process is that the polymer precipitate recovered from the water/organic anti-solvent medium will be both free of impurities which are water soluble and those which are soluble in the organic anti-solvent.

Polymers which can be isolated by this process in solid, powdery form generally have a molecular weight average above about 200 and this average may range from about 10,000–50,000. The degree of polymerization can range from dimers to above 10,000. These polymers can be obtained by homopolymerization or copolymerization, by condensation reactions, addition reactions, etc. The term "polymers" as used herein refers to thermoplastic polymers, i.e., those which become plastic and flowable under the action of pressure and heat, and elastomers, i.e., those which stretch under tension and/or retract rapidly and recover to their original dimensions. Examples of suitable thermoplastics include polycarbonates, such as linear and cyclic polycarbonates and polyester polycarbonates; polystyrene, such as high impact polystyrene and brominated derivatives of polystyrene; polyphenylene ethers; polyetherimides; polyesters, including polyethylene terephthalates and polybutylene terephthalates. Examples of suitable elastomers include synthetic diene rubbers, such as polybutadiene and isoprene; butyl rubbers; polyisobutene rubbers; ethylene-propylene rubbers; ethylene-propylene-diene rubbers wherein the diene is non-conjugated (EPDM rubbers); chloroprene rubbers; and others known to the art. Blends of one or more polymers can also be isolated.

The one or more organic solvents which contain the polymer resin preferably have boiling points below 100° C. at one atmosphere. Although organic solvents with boiling points significantly higher than 100° C. can be utilized, a significant loss in efficiency of the process will result due to the large quantities of water which are vaporized and possibly the organic anti-solvent. When the organic solvent forms an azeotrope with water, the loss of efficiency will not be as great.

According to the present invention, there may be conveniently utilized organic solvents having concentrations of polymer resin of up to approximately 50% by weight polymer. Solutions of a higher concentration will be difficult to handle due to their high viscosity and stickiness. The most preferred concentrations of polymer resin fall within the range of about 10 to 30 weight percent.

The organic solvent must be immiscible in water so as to form a separate phase. Examples of solvents which are immiscible in water and from which polymers may be isolated by the process disclosed herein are chlorinated and brominated hydrocarbons having from 1 to 20 carbon atoms, for example, methylene chloride, 1,1,2,2-tetrachloroethane, 1,2-dichloroethylene, chlorobenzene, chloroform, dichlorobenzene, 1,1,2-trichloroethane and aromatic and aliphatic hydrocarbon solvents such as benzene, xylene, toluene, pyridene, mesilytene and the like. Mixtures of the above solvents are also suitable.

Solutions with high molecular weight polycarbonate resin, which are directly obtained from a synthesis process carried out in the presence of a solvent, are particularly suitable for use in the practice of this invention. Exemplary of such solutions are those obtained by interfacial polycondensations of phosgene and bisphenol A, preferably using methylene chloride as the solvent. The preferred concentrations of polycarbonate resin within the methylene chloride fall within the range of about 10–30 weight percent. This preferred range also applies to other polymer resins and their solvents, such as polystyrene, polyphenylene ethers, polyesters, ethylene-propylene-diene rubbers (EPDM rubbers), polyetherimides, diene rubbers, etc.

Mixing the organic solvent containing polymer resin with the water/organic anti-solvent medium may be conveniently achieved within a vessel by means of an impeller or similar device. These components may be mixed under conditions of low-speed, low-shear agitation. The term "low-speed, low-shear agitation" as used herein refers to the level of agitation obtained by a conventional mixing apparatus, as contrasted to the high speed shearing devices specified by N. V. Wood in U.S. Pat. No. 3,267,074. Sufficient admixing can be obtained by rotating an impeller at speeds of about 5 ft. per second and below. Impeller speeds of about 1 ft. per second are suitable and preferred due to the low consumption of energy. Lower tip speeds are also suitable, particularly where the design of the apparatus compensates for the low speed.

Although the high speed, high r.p.m. shearing devices of N. V. Wood will isolate polymers from solution in accordance with this process, the high rates of speed which are characteristic of these devices are not required.

The term "low speed, low-shear agitation", as utilized herein, is closely analogous to the "non-shearing agitation" defined by Herscovici in U.S. Pat. No. 4,205,162 as ". . . below the minimum value of 2000 r.p.m. specified in U.S. Pat. No. 3,267,074 to N. V. Wood". The impeller speeds utilized in this invention are often obtained at r.p.m.'s less than 400. However, the term "low-speed, low-shear agitation" excludes those levels of agitation provided within specialized equipment which obtain high shear and high tip speeds (e.g., 40 ft. per second) below 2000 r.p.m.

Vaporization of the organic solvent commences immediately upon mixing this solvent with the water/organic anti-solvent medium. Vaporization of the organic solvents is conveniently achieved by heating the admixture to a temperature within the range of from about 10° to 20° C. below to about 30° C. above the boiling point of the organic solvents.

The temperature utilized is determined by the organic solvents within the organic solution; however, the temperature should not exceed the glass transition temperature of the polymer to be isolated. The preferred temperatures fall within the range of about 5° C. below the boiling point of the organic solvent to 10° C. above the boiling point of the solvent. For methylene chloride, the most preferred range is about 35° C. to 55° C. at about one atmosphere pressure. For toluene, an azeotrope forms with water and the most preferred temperature range is about 80° C. to 100° C. and for hexane, the most preferred range is about 60° C. to 75° C. at about one atmosphere pressure. Pressures of from 0.1-2 atmospheres may be conveniently utilized; and, pressures outside this range can also be utilized as desired.

The rate of volatilization will have little effect on the polymer product obtained. Although the vaporization rate can be varied widely, the vaporization rate will not cause the polymer to agglomerate. The organic anti-solvent serves to dilute the organic solvents, causing the polymer to precipitate prior to agglomeration of the polymer. Therefore, granules of the polymer will not form and the polymer will not form a sticky mass within the isolating medium.

The weight ratio of water to total polymer, including solids and resins within solution, can vary widely but is preferably maintained at about 2:1 and above. Weight ratios below 1:1 will cause the admixture to be highly viscous and the high solids content of the effluent slurry will be difficult to handle. Although there is no upper limit to the value for this ratio, utilizing a weight ratio above 50:1 reduces the efficiency of the process.

The polymer precipitate produced by this process is powdery in nature and the solids exhibit an average size below about 500 microns. The particle sizes fall within the range of about 1-500 microns. The polymer powder can be separated from the water/organic anti-solvent medium by conventional liquid-solid separation techniques, such as centrifugation, filtration, screening and the like. The powder may be easily dried, if desired, prior to the use within subsequent processing equipment. The polymer powder exhibits a low residual organic anti-solvent and water content upon liquid-solid separation treatment. The bulk density and morphology of the solid polymer powder is similar to that obtained in conventional anti-solvent precipitation processes, such as that of Marshall et al., U.S. Pat. No. 4,182,850.

The process of this invention can be operated continuously, semi-continuously or batchwise. The organic anti-solvent/water solution is recyclable in that once the solids are separated, this solution may be returned to the process. The anti-solvent is not evaporated from this solution in the preferred embodiments, but where vaporization occurs, the solution may be replenished with anti-solvent.

The following examples are provided to illustrate the embodiments of this invention. It is not intended to limit the scope of this invention to the embodiments described.

EXAMPLE 1

To a 150 gram solution of 15 weight percent polycarbonate in methylene chloride, 40 grams of methylisobutyl ketone and 400 grams of water were added. Heat was gradually applied to the vessel (final temperature=about 40° C.) to evaporate the methylene chloride without significant evaporation of the methylisobutyl ketone. Agitation was maintained within the vessel through the use of an impeller having a tip speed of approximately 1 ft. per second. When enough methylene chloride had evaporated from the mixture, a polycarbonate precipitate was observed. Upon filtration, a finely divided polycarbonate powder was obtained.

EXAMPLE 2

To a 150 gram solution of 15 weight percent polycarbonate in methylene chloride, 45 grams of n-heptane and 400 grams of water were added. Heat was gradually applied to the vessel (final temperature=about 40° C.) to evaporate the methylene chloride with substantially no vaporization of n-heptane. Agitation was maintained within the vessel through the use of an impeller having a tip speed of about 1 ft. per second. When enough methylene chloride had evaporated, a precipitate was obtained which was filtered to provide a finely divided polycarbonate powder.

EXAMPLE 3

The procedure described in Example 1 was repeated with 60 grams of methylethyl ketone utilized as an anti-solvent with 400 grams of water. Heating and agitation were maintained as described in Example 1 with substantially no vaporization of methylethyl ketone. A precipitate formed and a finely divided polycarbonate powder was recovered upon filtration.

EXAMPLE 4

To a 150 gram solution of 15 weight percent polyphenylene ether in toluene, 400 grams of water and 70 grams of pentanol anti-solvent were added. Heat was then applied to the mixture to evaporate toluene (final temperature=about 90° C.) with substantially no vaporization of pentanol. Agitation was maintained within the vessel through the use of an impeller having a tip speed of approximately 1 ft. per second. When enough toluene evaporated from the mixture, a precipitate was observed and filtered to yield a finely divided polyphenylene ether powder.

EXAMPLE 5

The procedure described in Example 4 was repeated with 55 grams of hexanol replacing the 70 grams of pentanol utilized in Example 4. Heating and agitation were maintained in the vessel as described in Example 4 (final temperature=about 90° C.) with substantially no vaporization of hexanol. A polyphenylene ether precipitate was generated which was found to be a finely divided powder upon filtration from the solution.

Although the above examples have shown embodiments of the present invention, modifications of these embodiments will be obvious to those skilled in the art and are considered within the scope of this invention.

What is claimed is:

1. A process for isolating polymer resins from water-immiscible organic solvents which comprises mixing the organic solvent containing up to 50% by weight polymer within a separation medium comprised of water and an organic anti-solvent for said polymer so as to form both an organic solvent phase and an aqueous phase, while vaporizing the organic solvent without significant vaporization of the organic anti-solvent and recovering a powdery polymer precipitate from the mixture formed, the weight ratio of organic anti-solvent to polymer falling in the range of about 10:1 to 1:1, and said organic anti-solvent being preferentially soluble in said organic solvent.

2. A process as in claim 1 wherein the organic anti-solvent is immiscible in water.

3. A process as in claim 1 wherein mixing is achieved with low-speed, low-shear agitation.

4. A process as in claim 1 wherein the polymer is selected from the group consisting of polycarbonate, polystyrene, polyphenylene ether, polyester, polyetherimide and ethylene-propylene-diene rubbers.

5. A process as in claim 1 wherein the organic solvents are selected from the group consisting of methylene chloride and toluene.

6. A process as in claim 1 wherein vaporization of the organic solvent is achieved by heating the mixture formed to a temperature within the range of about 10° C. below to 30° C. above the boiling point of the organic solvent.

7. A method as in claim 6 wherein less than 10% of the organic anti-solvent is vaporized.

8. A process for isolating polycarbonate resin from methylene chloride which comprises mixing a methylene chloride solution containing up to about 50% by weight polycarbonate within a separation medium comprised of water and an organic anti-solvent for polycarbonate under conditions of low-speed, low-shear agitation while vaporizing the methylene chloride without significant vaporization of the organic anti-solvent and recovering a powdery polycarbonate from the mixture formed, said organic anti-solvent being selected from the group consisting of n-pentanol, n-hexanol, methylisobutyl ketone, heptane, hexane and methylethyl ketone; the ratio of organic anti-solvent to polycarbonate falling in the range of about 10:1 to 1:1.

9. A method as in claim 8 wherein the polycarbonate is cyclic, low molecular weight polycarbonate.

10. A method for isolating polyphenylene ether resins from toluene which comprises mixing a toluene solution containing up to about 50% by weight polyphenylene ether within a separation medium comprised of water and an anti-solvent for polyphenylene ether under conditions of low-speed, low-shear agitation so as to form both an organic solvent phase and an aqueous phase, while vaporizing the toluene without significant vaporization of said organic anti-solvent and recovering a powdery polyphenylene ether precipitate from the mixture formed, said organic anti-solvent being selected from the group consisting of pentanol, n-hexanol and methylisobutyl ketone; the ratio of anti-solvent to polyphenylene ether falling in the range of about 10:1 to 1:1.

* * * * *